United States Patent [19]
Scheer

[11] Patent Number: 5,127,778
[45] Date of Patent: Jul. 7, 1992

[54] MUSICAL REED DUPLICATION

[76] Inventor: Wayne T. Scheer, 45 University Pl., Amsterdam, N.Y. 12010

[21] Appl. No.: 699,607

[22] Filed: May 14, 1991

[51] Int. Cl.$^5$ ............................................. B23B 35/00
[52] U.S. Cl. .................................... 409/132; 73/849; 84/383 A; 408/1 R; 408/2
[58] Field of Search .......................... 408/1 R, 2, 3, 19; 73/849; 84/383 A; 364/474.01, 474.37; 409/133, 132

[56] References Cited

U.S. PATENT DOCUMENTS

| | | |
|---|---|---|
| 1,770,966 | 7/1930 | Arthur . |
| 1,776,566 | 9/1930 | Newton et al. . |
| 1,915,289 | 6/1933 | Broadus . |
| 2,013,567 | 9/1935 | Maccaferri . |
| 2,049,235 | 7/1936 | Tour et al. . |
| 2,299,722 | 10/1942 | Burns et al. . |
| 2,456,299 | 12/1948 | Miller ........................ 84/383 A |
| 2,649,708 | 8/1953 | Maccaferri . |
| 2,680,374 | 6/1954 | Hall . |
| 3,110,134 | 11/1963 | Rabinowitz . |
| 3,165,963 | 1/1965 | Burns . |
| 3,340,759 | 9/1967 | Petzke . |
| 3,605,909 | 9/1971 | Lemelson . |
| 3,640,633 | 2/1972 | Gersch et al. . |
| 3,705,820 | 12/1972 | Knotik et al. . |
| 3,827,333 | 8/1974 | Hurd . |
| 4,052,132 | 10/1977 | Oates . |
| 4,118,139 | 10/1978 | Lemelson . |
| 4,145,949 | 3/1979 | Kilian . |
| 4,172,482 | 10/1979 | Gomez . |
| 4,355,560 | 10/1982 | Shaffer . |
| 4,552,493 | 11/1985 | Schultschick . |

FOREIGN PATENT DOCUMENTS 159462  3/1983  German Democratic Rep. ... 73/849

Primary Examiner—Daniel W. Howell
Attorney, Agent, or Firm—Shoemaker and Mattare, Ltd.

[57] ABSTRACT

A machine for duplicating musical reeds comprises a force sensor supporting a drill bit, which acts both as a measuring contact, when stationary, or as a tool for removing material from the surface of a reed, when rotated. A flexural resistance map of a master reed, having desirable musical characteristics, is made initially, by moving the drill bit toward the reed surface a predetermined distance after initial contact is made, and storing the resultant reaction force in a computer. The master reed is then replaced with a new reed, at least as stiff as the master, and the process is repeated, comparing the readings with corresponding readings for the master. Where the reed is too stiff, material is removed from its surface by the drill bit; this is repeated over the entire reed surface, until the flexural resistance map of the new reed matches that of the master.

6 Claims, 7 Drawing Sheets

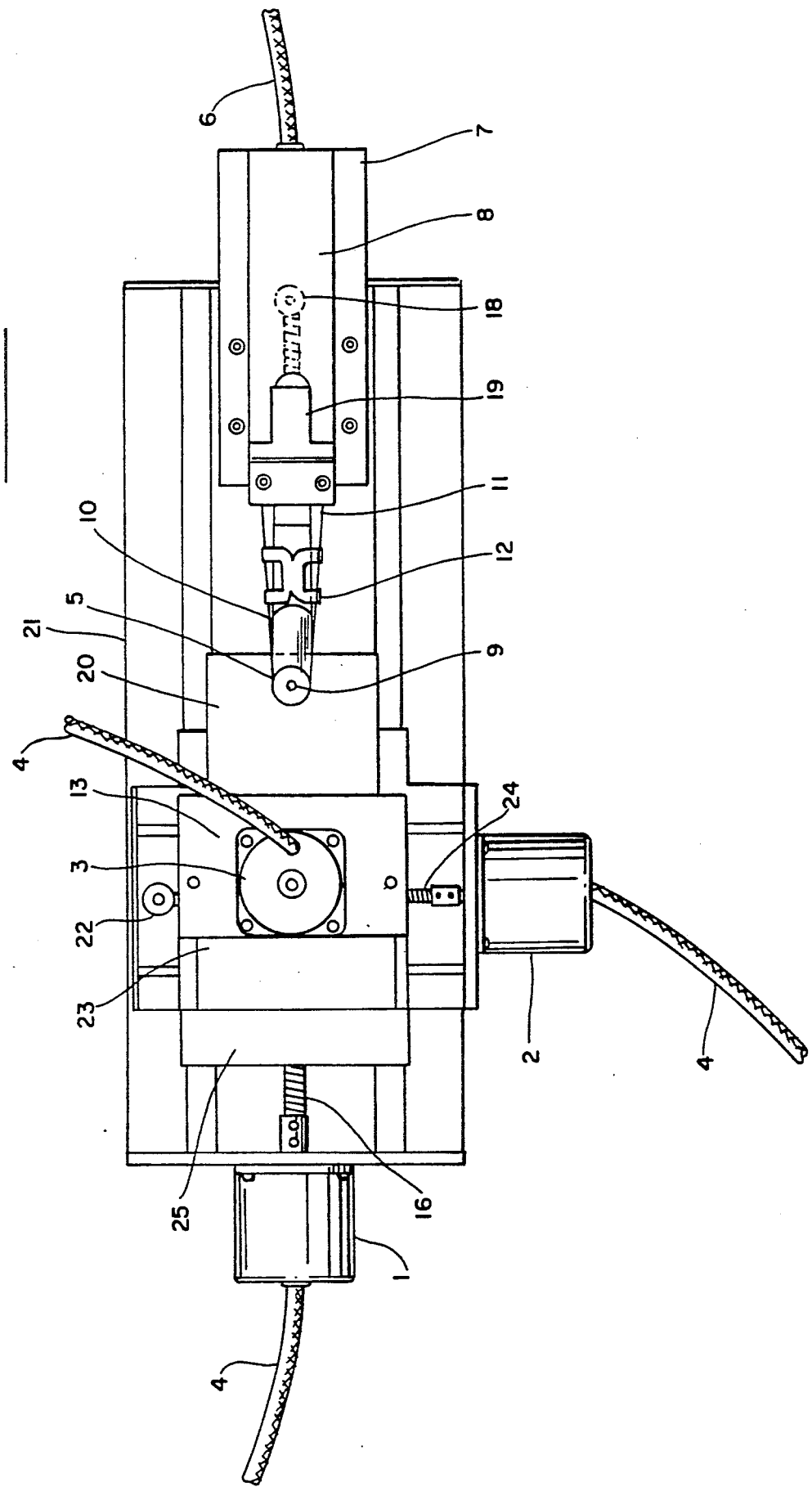

FIG. 4a.

| | | | | | | | | | |
|---|---|---|---|---|---|---|---|---|---|
| 0 | 0 | 0 | 0 | 0 | 0 | 29 | 33 | 34 | 35 |
| 0 | 0 | 0 | 28 | 32 | 35 | 37 | 42 | 43 | 44 |
| 0 | 0 | 28 | 34 | 38 | 42 | 46 | 50 | 52 | 54 |
| 0 | 28 | 35 | 42 | 46 | 50 | 55 | 59 | 62 | 65 |
| 28 | 35 | 42 | 49 | 55 | 61 | 66 | 70 | 74 | 77 |
| 32 | 41 | 49 | 59 | 65 | 71 | 77 | 82 | 87 | 90 |
| 39 | 49 | 58 | 68 | 74 | 82 | 89 | 96 | 101 | 103 |
| 46 | 57 | 68 | 79 | 87 | 97 | 104 | 111 | 118 | 122 |
| 53 | 63 | 79 | 89 | 100 | 109 | 118 | 127 | 133 | 139 |
| 60 | 74 | 90 | 102 | 114 | 127 | 136 | 145 | 153 | 159 |
| 69 | 85 | 101 | 116 | 130 | 143 | 155 | 164 | 172 | 179 |
| 79 | 95 | 115 | 130 | 145 | 161 | 172 | 180 | 192 | 199 |
| 87 | 105 | 128 | 147 | 163 | 180 | 190 | 198 | 211 | 221 |
| 99 | 119 | 145 | 162 | 183 | 195 | 211 | 222 | 234 | 242 |
| 110 | 132 | 159 | 179 | 199 | 216 | 225 | 247 | 251 | 263 |
| 124 | 150 | 177 | 199 | 221 | 239 | 251 | 267 | 270 | 285 |
| 137 | 163 | 193 | 221 | 242 | 262 | 270 | 286 | 292 | 304 |
| 150 | 178 | 211 | 242 | 260 | 282 | 294 | 307 | 317 | 327 |
| 166 | 196 | 230 | 265 | 283 | 296 | 314 | 325 | 341 | 350 |
| 183 | 217 | 255 | 297 | 308 | 327 | 341 | 358 | 371 | 373 |
| 194 | 238 | 275 | 322 | 331 | 340 | 366 | 385 | 393 | 398 |
| 226 | 272 | 313 | 355 | 373 | 382 | 406 | 416 | 427 | 429 |
| 240 | 292 | 339 | 369 | 397 | 389 | 435 | 445 | 451 | 449 |
| 264 | 328 | 371 | 417 | 415 | 445 | 469 | 466 | 474 | 474 |

FIG. 4b.

| | | | | | | | | | | | | | | |
|---|---|---|---|---|---|---|---|---|---|---|---|---|---|---|
| 37 | 37 | 37 | 37 | 36 | 35 | 34 | 33 | 29 | 0 | 0 | 0 | 0 | 0 | 0 |
| 46 | 46 | 47 | 46 | 45 | 43 | 43 | 41 | 39 | 36 | 32 | 28 | 0 | 0 | 0 |
| 55 | 55 | 55 | 55 | 53 | 51 | 50 | 48 | 46 | 42 | 39 | 35 | 28 | 0 | 0 |
| 67 | 68 | 65 | 65 | 63 | 61 | 60 | 58 | 55 | 51 | 46 | 42 | 36 | 28 | 0 |
| 80 | 80 | 81 | 80 | 77 | 75 | 73 | 70 | 66 | 61 | 56 | 50 | 44 | 37 | 28 |
| 93 | 94 | 92 | 91 | 90 | 86 | 85 | 81 | 76 | 70 | 61 | 57 | 51 | 42 | 34 |
| 108 | 108 | 108 | 108 | 106 | 102 | 99 | 96 | 89 | 82 | 72 | 66 | 59 | 49 | 39 |
| 126 | 120 | 127 | 126 | 124 | 120 | 116 | 110 | 103 | 95 | 84 | 75 | 65 | 55 | 46 |
| 144 | 142 | 145 | 144 | 141 | 137 | 129 | 127 | 118 | 106 | 97 | 86 | 75 | 64 | 52 |
| 163 | 165 | 166 | 165 | 162 | 156 | 145 | 144 | 133 | 121 | 111 | 97 | 85 | 73 | 60 |
| 184 | 187 | 186 | 186 | 182 | 177 | 170 | 162 | 154 | 139 | 127 | 112 | 97 | 83 | 68 |
| 205 | 205 | 208 | 207 | 202 | 196 | 190 | 177 | 169 | 156 | 139 | 122 | 109 | 91 | 76 |
| 226 | 226 | 228 | 228 | 222 | 217 | 210 | 198 | 188 | 175 | 156 | 138 | 121 | 103 | 86 |
| 245 | 248 | 249 | 250 | 246 | 236 | 233 | 218 | 205 | 192 | 172 | 152 | 136 | 112 | 96 |
| 266 | 268 | 270 | 271 | 265 | 260 | 252 | 238 | 222 | 209 | 190 | 169 | 152 | 124 | 104 |
| 287 | 289 | 291 | 293 | 290 | 279 | 269 | 256 | 242 | 230 | 208 | 176 | 168 | 139 | 116 |
| 309 | 310 | 312 | 313 | 310 | 302 | 291 | 273 | 263 | 248 | 230 | 198 | 186 | 154 | 128 |
| 326 | 324 | 335 | 332 | 329 | 321 | 310 | 297 | 282 | 257 | 239 | 219 | 201 | 167 | 141 |
| 347 | 353 | 358 | 359 | 355 | 344 | 339 | 322 | 298 | 283 | 261 | 236 | 219 | 182 | 152 |
| 375 | 375 | 384 | 380 | 376 | 370 | 360 | 346 | 313 | 300 | 288 | 262 | 237 | 197 | 167 |
| 405 | 396 | 407 | 402 | 400 | 395 | 385 | 370 | 330 | 317 | 305 | 276 | 244 | 207 | 179 |
| 433 | 428 | 432 | 436 | 425 | 417 | 403 | 394 | 327 | 353 | 332 | 297 | 258 | 209 | 194 |
| 458 | 448 | 452 | 458 | 447 | 441 | 424 | 415 | 361 | 384 | 359 | 305 | 285 | 222 | 202 |
| 484 | 461 | 477 | 474 | 475 | 454 | 442 | 425 | 366 | 409 | 381 | 355 | 283 | 234 | 221 |

FIG. 6

MENU PAGE

The Reed Machine

A. Load the Velmex            K. Communicate with Velmex

B. Zero the Strain Card       L. Quit Program

C. Scan the Reed              M. Scan/Cut

D. List the Reed Data         P. Print the Reed Data

E. Edit the Reed Data         Q. Compare Two Files

F. Save the Reed Data         R. Average

G. Load the Reed Data         Y. Zero the Program

I. Make the Reed from the Data    Z. Flex at Current Point

J. Change Size of the Scan

Select an Option:

MUSICAL REED DUPLICATION

BACKGROUND OF THE INVENTION

This invention relates to reed instruments of the so-called "beating type", including woodwinds, and in particular, to reed testing and selecting devices for such instruments.

The selection of musical reeds, made of natural material such as cane, is an art form requiring substantial experience and judgement. Natural materials are not uniform; even the best natural materials have significant and unpredictable variations in stiffness and density. Therefore, geometrical duplication of reeds does not produce musical identical reeds. In fact, the tonal differences between geometrically identical reeds can be substantial. Therefore, using known devices to physically reproduce a reed having good tonal qualities cannot be relied upon to produce musically equivalent pieces.

SUMMARY OF THE INVENTION

In view of the foregoing, it is an object of this invention to reproduce the tonal qualities of a master musical reed. A related object is to machine a reed in a way that compensates for variations in physical qualities of the material from which the reed is made. The invention is particularly useful for reproducing reeds made of natural materials.

A machine embodying the invention, for duplicating musical reeds, comprises a force sensor supporting a drill bit, which acts both as a measuring contact, when stationary, or as a tool for removing material from the surface of a reed, when rotated. A flexural resistance map of a master reed, having desirable musical characteristics, is made by moving the drill bit a predetermined distance after it contacts the reed surface, and storing the resulting reaction force in computer memory. This procedure is repeated at intervals over the reed surface. The master reed is then replaced with a new reed, at least as stiff as the master, and the process is repeated, comparing the readings with corresponding readings for the master. Where the reed is too stiff, material is removed from its surface, by the drill bit; this is done over the entire reed surface, until the deflection map of the new reed matches that of the master.

With this invention, one can clone reeds for all single and double reed music instruments—any reed desired—from a reed having superior playing characteristics.

There are a number of benefits provided by the invention. One benefit is that once one has chosen a model reed to duplicate, a survey of its pliability can be made automatically across the convex, upper surface of the reed. This information is stored in memory for subsequent use.

Another advantage of the invention is its ability to make a detailed analysis of the whole model reed's flex characteristics, therefore permitting one to determine and display its true playing strength. The invention employs a force sensor load cell to measure flexural resistance strengths at a predetermined deflection distance. Readings are taken at intervals, as the machine scans the reed from tip to heel as well as from left to right.

The invention does not measure the reed's physical contour, as profiling machines do, but rather takes flexural resistance measurements, and generates a digital map. Over one thousand flex point readings may be taken at one-half millimeter intervals over the surface of the reed. All of these numerical readings are stored in the controlling computer's memory for future use or comparison.

A further object of this invention to enable one to access stored flex resistance readings and change any of them. With this ability, not only can one make an exact duplicate of a model reed; he can actually further refine it to create a perfect reed, by compensating for differences in reed material, hardness, or density.

The machine's sensor is moved in three orthogonal directions by three computer controlled, motorized carriages or sleds. Connected to the vertically movable sled is fastened a drill chuck which holds a small dentist's drill. This drill, when not rotating, is used to take all of these flex readings. When the motor is activated, the bit can make adjustments to the reed being worked on by removing material from the new reed until the greater stiffness of the new reed is reduced to the readings of the master. When all necessary machining has been done, the flex of the entire reed tip is the same as the master, and the new reed assumes the playing characteristics of the master.

An additional advantage of this device is its ability to show, by numerical comparisons, the effect of different styles of ligatures that secure the reed to the mouthpiece on single reed instruments. Differences of playing characteristics have been noted by musicians in the past using the same reed, with differently shaped ligatures. Still unknown to us is why ligatures made of different shapes or materials will change a reed's sound from "bright" to "mellow" or to "dark", or why certain notes in different registers may be less or more pronounced. To duplicate playing conditions as closely as possible, an actual mouthpiece and ligature are used to mount the reed to the force sensor load cell.

An important observation in the testing of prospective reeds to be cloned, is whether they have sufficient strength for adjustment. One is thereby able to determine the possible natural weaknesses or strengths in the cane or synthetic material to be used for the new reed.

A further feature includes the provision of apparatus which will accommodate various sizes and shapes of reeds. With a properly designed holding device, one can not only adjust single reeds of various sizes, but can also adjust double reeds in much the same way.

BRIEF DESCRIPTION OF THE DRAWINGS

In the accompanying drawings.

FIG. 3 is a top plan view thereof.

FIGS. 4A and 4B are a flexural resistance map of a typical reed, showing resistance force in arbitrary units, 6.7 of which equal one gram; the force is that resulting from a deflection of 0.006 inch. FIG. 4b is a horizontal continuation of FIG. 4a; that is, the lines of numerals on FIG. 4b should appear to the right of the numerals in FIG. 4a.

FIG. 6 shows the main menu of the host computer.

DESCRIPTION OF THE PREFERRED EMBODIMENT

Figure 1:
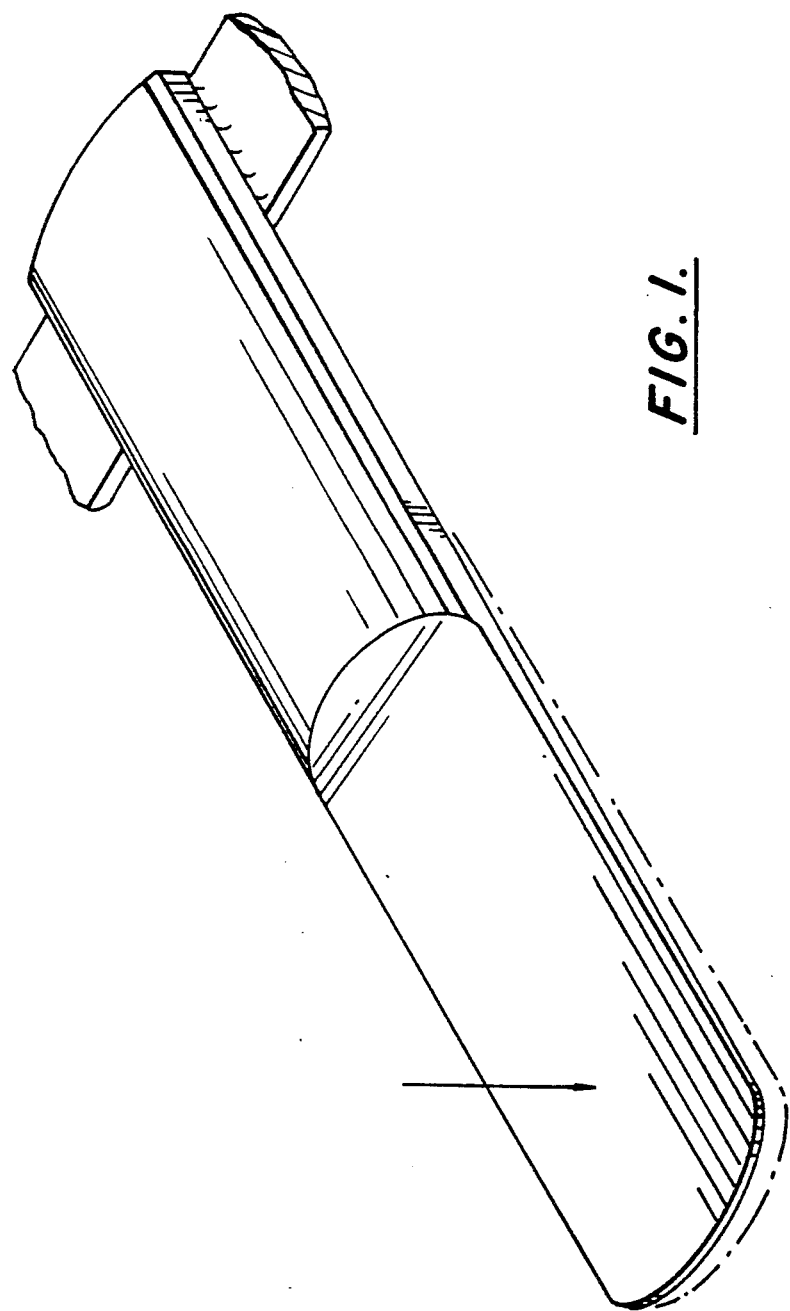
FIG. 1 is an isometric view of a typical clarinet reed; the broken line connotes deflection.

FIG. 1 shows the basic shape of a typical reed. The reed is thirteen millimeters across at its widest part and has a gradual taper towards its heel, being approximately twelve millimeters wide at a point twenty-five millimeters from the heel. The rounded tip, approximately three millimeters long, has a curved beak. This mirrors the basic shape of the mouthpiece, which is just below it.

Figure 2:
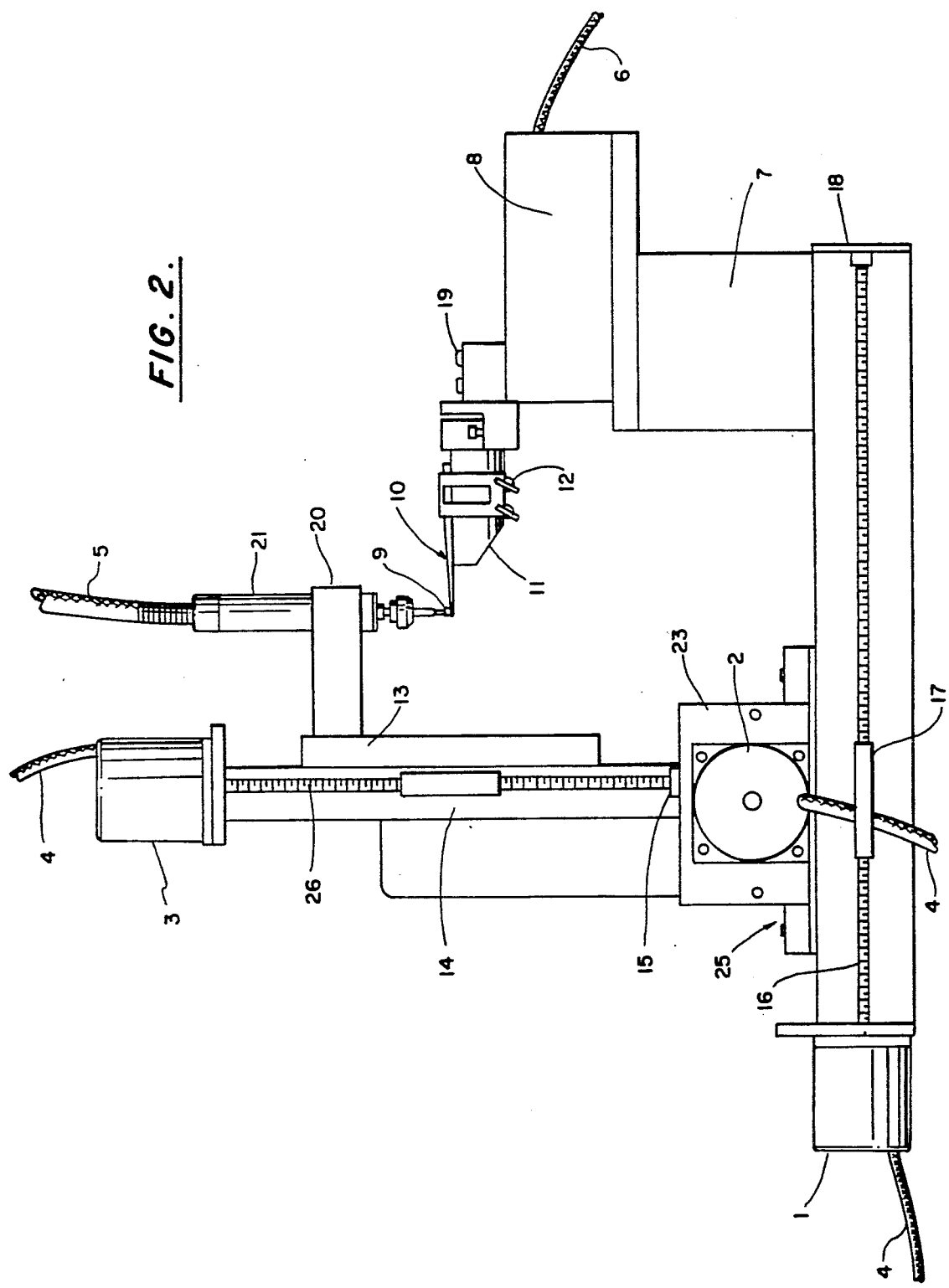
FIG. 2 is a front elevation of an apparatus embodying the invention.

An apparatus embodying the invention, shown in FIG. 2, comprises a base provided with horizontal ways that support a first sled 25. The first sled 25 is moved horizontally along the ways by a screw 16, supported by bearings 17,18 and driven by a rotary stepper motor 1. The first sled 25, as seen in FIG. 3, has ways of its own, on which a second sled 23 is mounted for movement in a second horizontal direction perpendicular to the first. The second sled 23 is driven by a stepper motor 2 and screw 24 (supported by bearing 22). The second sled 23 has vertically extending ways, on which rides a third sled 13. Vertical movement of this sled is controlled by a third stepper motor 3 and lead screw 26, having bearings 14,15. The third sled has a bracket 20 that supports a vertically oriented drill chuck 21, which is driven from a motor (not shown) by a flexible shaft 5. The stepper motors are driven by electrical signals delivered from a control/driver (not shown) via wires 4. A small drill bit 9 is shown protruding from the lower end of the chuck.

At the lower right of FIG. 2, one can see a vertical support 7 affixed to the base. A force sensor 8, attached to the top of the support, in turn supports a mouthpiece holder 19. Numeral 6 designates a conductor which leads from the force sensor to a responsive computer, not shown.

A mouthpiece 11 is shown affixed to the holder, with a reed 10 attached thereto by conventional ligatures 12. The mouthpiece has had the front two centimeters removed—these two centimeters are commonly called the mouthpiece tip opening or the "lay". Removing the tip increases the accuracy of flex readings; the mouthpiece is otherwise unmodified.

The drill bit 9 can be brought to bear against the upper surface of the reed. The particular point on that surface which is engaged by the bit can be selected by moving the first and second sleds with their respective stepper motors. The stepper motor and screw arrangements permit precise positioning of the drill bit in three orthogonal directions.

The drill assembly 9,20,21,13, by means of predetermined movements of the three screw driven motorized sleds 13,23,25, is able to move to computer programmed positions to take flex readings or make necessary machining adjustments to the reed.

The top of the drill bit 9 is initially poised two millimeters above the reed to be scanned in the home position, as shown in FIG. 1.

In operation, the host computer, the control/driver computer, and the printer are activated. After the host computer is "booted", the control program is loaded, and the main menu (FIG. 6) appears on the monitor. (The program, written in BASIC, appears at the end of this description.)

From the main menu, option "Y" is initially selected, to zero the load cell assembly. The result is numerically displayed in the upper right hand portion of the computer monitor. The reason for zeroing the load cell is that the mouthpiece, reed, and ligature have different cumulative weights according to their size and may vary from trial to trial.

The next selection from the menu is option "J". This provides a choice of the number of flex points desired. For a typical clarinet reed one might choose 25 points across the width and 56 points along its length, for a total of 1400 flex points to record.

On selection of the "C" menu option, the computer initiates scanning of the reed 10. The first sled 25 rotates its screw 16, by means of the stepper motor 1, bringing the whole assembly left, away from the home position, to row number one.

Stepper motor 3 now rotates its screw 26, bringing the third sled 13 downward toward the reed's surface. Initially, due to the shape of the tip of the reed, the sensor finds no reed, and records a zero. The computer next returns the bit to its vertical home, as stepper motor 3 moves the sled 13 to that position. Stepper motor 2 now rotates its screw 24, bringing the second sled 23 forward one-half millimeter for reading number two.

The reed scanning starts in the upper left hand portion of the reed just below the point where the three millimeter portion starts its rounded curve. This position is where the reed is placed before playing, just above the rounded beak of the mouthpiece. This is a logical starting point, for it provides a point that has the least number of variants.

The point at which the scan is begun is set in memory as "home." This home point is three dimensional; that is the planes are left-right, forward-rear, and up-down. As the machine starts its scan of the reed from this home point, the machine moves three millimeters forward to start taking reading of the rounded tip area of the reed.

The machine takes a flex-point reading every one-half millimeter and stores its findings in memory. If there is no reed for it to measure, as happens at certain areas of the rounded tip, this is indicated in the record as zero. Preferably, twenty-five readings are taken from left to right and fifty-six readings are taken from the tip to the heel of the reed. The fourteen hundred readings thus taken form a resistance pattern matrix which is stored in the master computer's memory.

The route pattern moves from home, which is also the start of row five, then to the first row at the tip. It then travels to the right, taking readings as it goes every one-half millimeter. From the first row's furthest right measuring point, the machine moves to the second row's furthest right point and travels to the left, taking readings as it goes. From the second row's farthest left, it moves to the third row and takes its reading moving from left to right. This serpentine pattern continues until the whole scanning pattern is done on row twenty-eight. Then the tool tip is automatically moved back to home. The operator is then free to initiate further operations from the main menu.

In this example, the next five readings result in zeros due to the shape of the reed, since there is no contact, and thus no resistance. These zero readings are stored in the host computer's memory.

At point number seven of the first row, the drill tip for the first time is in a position to touch the reed. Stepper motor 3 rotates its screw 26, bringing the third sled 13 downward to the reed's surface so the dentist drill 9 can touch the reed 10. The screw 26 rotates to this point at high speed and stops upon contact. It next reverses its direction at a slow rate until the drill lifts away from the reed 10 so as not to register a reading and stops again. (These readings are continually registered on the computer's monitor for the operator to see.) The program next moves the drill 9 down slowly into contact with the reed 10, and stops when it has progressed 0.006 inch. The force applied to the reed 10 by the drill is sensed at this point by the sensor, and recorded in the host computer's memory. The reading obtained is the flex resistance offered by the reed.

FIGS. 4A and 4B show, in digital form, the resistance readings of a typical clarinet reed. The units are arbitrary, and must be divided by 6.7 to determine the force in grams. In this particular array, there are twenty-five readings from left to right, and twenty-four readings from tip to heel, six hundred readings in all. As the table shows, the readings at the tip of the reed are lower in value than those near the heel, since the reed is less flexible near the ligatures 12. Also note, the readings at the middle of the reed are higher than toward the sides.

Figure 5:
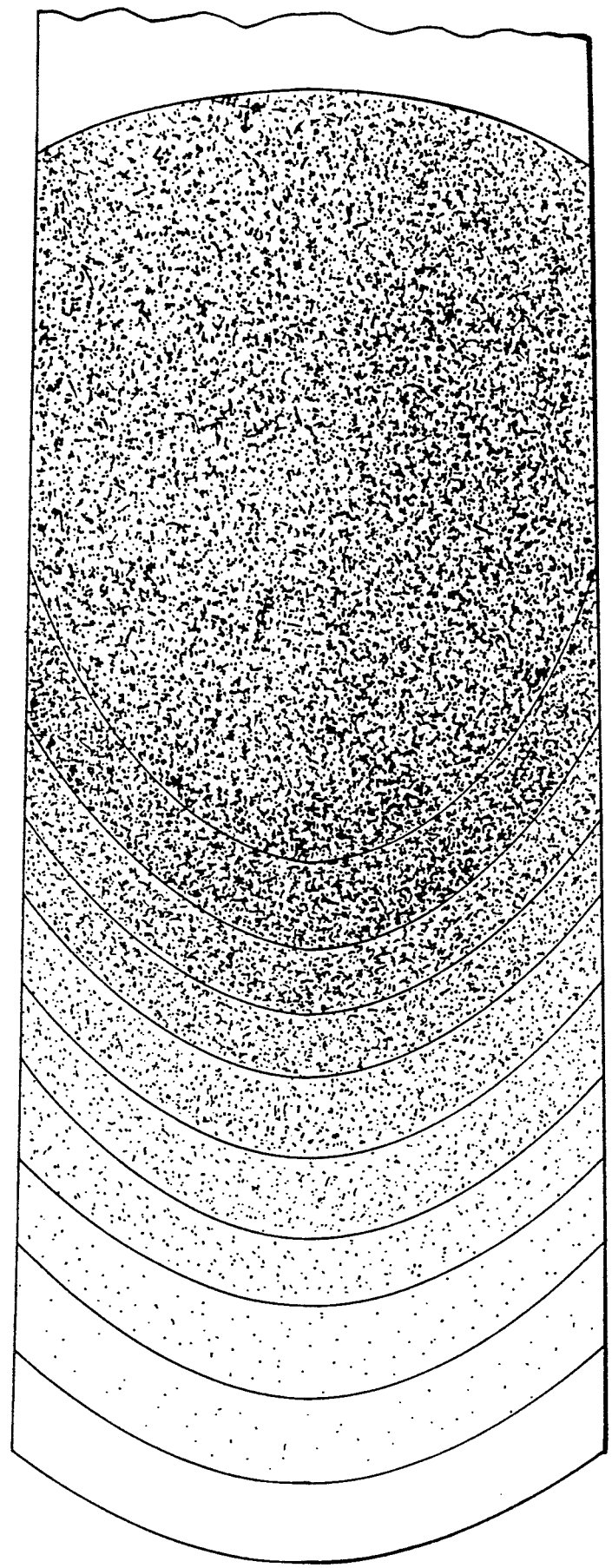
FIG. 5 is a graphical representation of the map of FIG. 4, greater deflections being represented by darker shades.

FIG. 5 is an graphical rendition of the map of FIGS. 4A and 4B. Low numbers are represented by light shades; higher numbers are darker. This can be compared to looking at an actual reed with back lighting and noticing the shaded variations of density of the reeds material—a technique musicians have used for years in selecting reeds that have an even grain and balanced symmetry. With the invention, a numerical/graphic display is created which shows exact differences between reed's flex resistance.

After the whole reed is scanned, option "F" is selected. Once a name is chosen for the reed, the reed's flex readings are transferred from memory into a permanent data file. This information can later be retrieved by recalling the named file.

To alter the reed, one may select option "E". In response, the computer queries what row and number (from left to right, 1-25) should be altered. After a desired alteration has been made, one may select another spot, or exit the operation. To keep the changed information, it may be saved to memory.

Another useful feature of the invention is its ability to compare two files. The advantage of this is being able to observe differences between two favorite reeds. After selecting option "Q", select the names of two reeds to compare. By performing appropriate mathematical operations, one can compare the numerical similarities or differences of these two reeds. Another feature is option "R", which permits comparison of the averages of three or more favorite reeds and calculate the possible perfect reed from their combined averages.

Two additional menu options, "A" and "K", are used to communicate with the secondary control/driver computer. This computer is from Velmex in Bloomfield, N.Y. The computer is a control/driver that sends commands to the stepper motors that move the three sleds. The "A" and "K" commands are needed to access the basic program that runs the machine. An RS-232 communication port connects the host computer and the Velmex computer for these various commands.

The "P" option commands the printer to print whatever is desired, for example, the computer program, the program in the host computer, whatever is displayed on the monitor screen, or the flex points at the completion of the run.

The final menu option is "I", by which one may clone reeds, after accessing information from the host computer's memory by selecting option "G", to recall information on a particular favorite reed.

When cloning a reed, the first step is to install a new reed 10 on the machine's mouthpiece 11 and secure it tightly in place with the ligature 12. Obviously, the new reed needs to be stiffer than the master, since machining can only reduce the stiffness of the new reed. The reed position should correspond to that shown in FIG. 2, i.e., with the drill placed two millimeters above the new reed's surface, at its home position.

Once the procedure is begun, the machine scans the surface of the new reed, and generates a flex resistance map. When this operation is done, the computer queries how close (in percent) the new reed must be to the master. The program causes the machine to go to the last row (furthest from the tip) of the reed. Experimentation has shown that the reed should be adjusted from tip to heel for best accuracy, for, it has been found, the heavier material at the back of the reed affects the thinner material in the rows ahead of it.

If the machine finds the numerical flex reading the same as the master reed, it skips that spot and goes on to whatever flex point in the program is numerically higher (stiffer). A flex reading is made at that point and the drill point 9 is lowered down firmly on the reed 10. The drill 9 is activated by activating the drive motor, to which it is connected by means of a flexible shaft 5. The computer program determines what force to apply to the reed, and how long the drill should rotate.

After the initial drilling, the drill 9 is lifted from the reed 10, and another flex reading is taken. If the drilling adjustment has made the flex reading on the new reed the same as the master, it goes on to the next spot to be adjusted. If the flex reading shows that additional adjustment is needed, the bit remains at that spot until proper flexure is obtained.

Once the whole reed surface has been read and adjusted, the new reed has substantially the same flex readings as the master, within the percentage that was selected, and will play substantially the same as the master, or exactly the same way, if zero was the percentage chosen. I have observed that reeds adjusted to within five percent of their masters have no discernable tonal difference; requiring smaller deviations requires longer processing time.

What the machine reads is resistance force resulting from a downward movement of 0.006 inch (which is just a quarter revolution of the sled screw 26) after initial contact. This distance was determined by experimentation. I have found a need for uniform amplification of the signal coming from the load cell sensor, since the output of the transducer is a function of the excitation voltage as well as the applied load. To provide this function, a special conditioner was constructed, comprising an amplifier card obtained from Sensor Developments Inc., Lake Orion, Mich. This special device is called a voltage conditioning module.

The load cell sensor itself is also supplied by Sensor Developments Inc. and is a transducer based on a Wheatstone bridge which has a measuring range from zero to one pound. By means of an A/D card, analog information is converted to provide a digital readout.

We have found that natural cane reeds frequently have a heavy vein of fiber. This vein causes an imbalance in the vibration of the whole reed. The scanning routine frequently shows that the veins run the entire length of the reed.

To correct for the effect of such veins, I prefer to start machining the reed surface near the tip. The reason for starting here, rather than at the heel, is that altering the reed at a certain spot affects flexural resistance only between that spot at the tip. There is no effect on points closer to the heel, and no effect on spots to either side. Therefore, after altering a particular spot on a vein, all spots along that vein are checked to see if further alteration at other spots is required.

With this invention, it is possible to provide an improved method for testing various other articles. I expect that with modification to accommodate differences in size and shape, products such as tennis rackets, polevault poles, skis, fishing poles, or other products in which flexure is an important feature of the design could be analyzed, modified, and improved.

The device could also be altered to provide a simple contour map of the surface of the reed (undeflected), by noting the tool tip position at each point of initial contact with the reed surface. The contour map could be generated alone, or at the same time the flex resistance map was being made.

Inasmuch as the invention is subject to these and other modifications, it is intended that the foregoing description should be regarded as only illustrative of the invention, which is to be measured by the claims that follow.

```
10  ' ***********************************************
20  ' *     FILE: WAYNE-1.BAS                        *
30  ' *                                              *
40  ' *     REED MEASURING AND MAKING PROGRAM        *
50  ' *                                              *
60  ' *     WRITTEN BY: WAYNE SCHEER      11-14-87   *
70  ' ***********************************************
80  '-----------------------------------------------
90  ' SET UP ALL VARS - INIT ALL DEVICES
100 '-----------------------------------------------
110 '   CHANGE MAXA TO THE NUMBER OF SCANS FROM FRONT TO BACK
120 '   CHANGE MAXB TO THE NUMBER OF SCANS FROM LEFT TO RIGHT
130 CLS : DEFINT A -Z : DIM ST(50,60) : MAXA = 1 : MAXB = 25 : MAXP = 90
140 DIM SQ(50,60): DIM SS(50,60): DIM S$(5): DIM SX#(5,5): DIM SN(50,60)  ' cut
array, "touch" array
150 GOSUB 550 : GOSUB 680 : WIDTH LPRINT 132 : LPRINT CHR$(27);"!"CHR$(4);
160 '-----------------------------------------------
200 ' START MAIN ROUTINE
210 '-----------------------------------------------
220 CLS : PRINT : PRINT "The Reed Machine   WAYNE-1" : PRINT : PRINT
230 PRINT TAB(10) "A. Load the Velmex         ",  "G. Load the Reed data",
240 PRINT TAB(10) "B. Zero the Strain Card",     "Y. Zero the program       ",
250 PRINT TAB(10) "C. Scan the Reed           ",  "I. Make Reed from the data",
260 PRINT TAB(10) "D. List the Reed data",       "J. Change size of the scan",
270 PRINT TAB(10) "E. Edit the Reed data",       "K. Communicate with Velmex",
280 PRINT TAB(10) "F. Save the Reed data",       "L. Quit Program"
290 PRINT TAB(10) "Z. Flex at current point",    "M. Scan/Cut "
300 PRINT TAB(10) "Q. Compare two files",        "R. AVERAGE "
305 PRINT TAB(10) "N. switch to CUT bit",        "O. switch to SCAN bit"
307 PRINT TAB(10) "P. Print the reed data":PRINT
310 PRINT : PRINT TAB(20) "Select an option: ";
320 GOSUB 2020 : Z$ = INKEY$ : IF LEN(Z$) = 1 THEN Z = ASC(Z$) ELSE 320
330 IF Z > 47 AND Z < 65 THEN CMD$ = Z : GOSUB 3450 : GOTO 320
340 Z = ASC(Z$) AND 223 : IF Z < 65 OR Z > 91 THEN 320 ELSE PRINT Z$;
350 GOSUB 2020 : Y$ = INKEY$ : IF Y$ = CHR$(8) THEN LOCATE ,POS(X)-1 : PRINT " "
;
360 IF Y$ = CHR$(8) THEN LOCATE ,POS(X)-1 : GOTO 320
370 IF Y$ <> CHR$(13) THEN GOTO 350 ELSE PRINT
380 IF Z$="q" OR Z$="Q" THEN GOSUB 14000:GOTO 220
390 IF Z$="r" OR Z$="R" THEN GOSUB 15000:GOTO 220
400 IF Z$="M" OR Z$="m" THEN GOTO 200
402 IF Z$="N" OR Z$="n" THEN GOSUB 11180: GOTO 200
403 IF Z$="O" OR Z$="o" THEN GOSUB 11190: GOTO 200
404 IF Z$="Y" OR Z$="y" THEN GOSUB 1200: GOTO 200
405 IF Z$="P" OR Z$="p" THEN GOSUB 2470: GOTO 200
410 IF Z$="Z" OR Z$="z" THEN GOSUB 9470:GOTO 200
420 ON Z - 64 GOSUB 670,1090,3050,2080,2160,2230,2350,2490,6000,2570,2620,510,47
0
430 GOTO 220
440 '-----------------------------------------------
450 ' get new pause value for scan loop(s)
460 '-----------------------------------------------
470 INPUT "What is the new PAUSE value: "; MAXP : RETURN
480 '------
490 ' quit
500 '------
510 CLS : PRINT #1, "&"; : END
520 '-----------------------------------------------
530 ' LOAD "IODRIVER.BIN" FILE INTO RAM - SET UP THE STRAIN GAUGE
540 '-----------------------------------------------
550 DEF SEG = 0 : V = PEEK(&H510) + (256*PEEK(&H511))
```

```
560 SEGID = V + &H2000 : DEF SEG = SEGID
570 BLOAD"IODRIVER.BIN",0 : IODR = 0
580 ' init the gauge
590 MD = 0 : CH =1 : DA = 0 : ST = 0
600 CALL IODR(MD,CH,DA,ST)
610 ' Zero the gauge
620 MD = 0 : CH = 1 : DA = 0 : ST = 0 : GOSUB 2040
630 CALL IODR(MD,CH,DA,ST) : RETURN
640 '-----------------------------------------------
650 ' SET UP COMMUNICATION PORT TO VELMEX CONTROLLER
660 '-----------------------------------------------
670 PRINT #1, "&"; : CLOSE #1 : INPUT "PRESS ANY KEY WHEN VELMEX IS READY"; Z$
680 OPEN "COM1:1200,E,7,1" AS #1 : ON COM(1) GOSUB 1050 : COM(1) ON
690 PRINT : PRINT
700 PRINT #1, "E"
710 PRINT #1, "90 V1=6000 : R1=5 : V2= 6000 : R2=5 : V3= 6000 : R3=5 : GOTO 280"
720 PRINT #1, "100 I2 =  166 : GOTO 37"           'RIGHT        6
730 PRINT #1, "110 I2 = -166 : GOTO 37"           'LEFT         4
740 PRINT #1, "120 I1 = -166 : GOTO 30"           'FORWARD      8
750 PRINT #1, "130 I1 =  166 : GOTO 30"           'BACK         2
760 PRINT #1, "140 I3 =   -1 : GOTO 43"           'UP           9
770 PRINT #1, "150 I3 =    1 : GOTO 43"           'DOWN         3
780 PRINT #1, "160 A3=0 : A1=0 : A2=0 : GOTO 30"  'HOME         7
790 PRINT #1, "170 P1=0 : P2=0 : P3=0 : GOTO 160" 'SET HOME     5
800 PRINT #1, "180 A2 =    0 : GOTO 37"           'LEFT HOME    1
810 PRINT #1, "190 I3 =   25 : GOTO 43"           'DOWN 25      ;
820 PRINT #1, "200 A3 =    0 : GOTO 43"           'VRT. HOME    =
830 PRINT #1, "210 I3 =   10 : GOTO 43"           'DOWN 10      <
840 PRINT #1, "220 I3 =  -10 : GOTO 43"           'UP 10        >
850 PRINT #1, "230 I3 =   50 : GOTO 43"           'DN 50        ?
860 PRINT #1, "240 I3 =  -50 : GOTO 43"           'UP 50        @
870 PRINT #1, "250 A3 =  0   : P3 = 0 : RETURN "  'SET VH       A
880 PRINT #1, "260 I3 =   13 : GO TO 43 "         'DOWN 13      B
890 PRINT #1, "262 I3 =   30 : GOTO 43"           'DOWN 30      C
900 PRINT #1, "264 I3 =  -20 : GOTO 43"           'UP 20        D
910 PRINT #1, "266 I2 = 4150 : GOTO 37"           'RIGHT 25rows E
920 PRINT #1, "267 I3 =    3 : GOTO 43"           'DOWN 3       F
922 PRINT #1, "268 I2 = -8900: GOTO 37"           'left 1" - cut bit  G
924 PRINT #1, "269 I2 = 8900: GOTO 37"            'right 1" - scan bit H
930 PRINT #1,"270 POKE 34818,16 : P=2.5 : GOSUB 0:POKE 34818,0 : RETURN" 'CUT :
940 PRINT #1, "280 I7 = 1:P = 0:V5 = 0:A5 = 128:GOSUB 55"      'PAUSE
950 'PRINT #1, "285 IF FL$="F" THEN GOSUB 268"
960 PRINT #1, "290 Z = ASC(FL$): FL$ = CHR$(0): IF Z < 48 OR Z > 72 THEN 280"
970 PRINT #1, "295 IF Z > 66 THEN ON Z-66 GOSUB 262,264,266,267,268,269"
980 PRINT #1, "300 ON Z-48 GOSUB 180,130,150,110,170,100,160,120,140,270,200"
990 PRINT #1, "310 IF Z > 58 THEN ON Z-58 GOSUB 190,210,200,220,230,240,250,260"
1000 PRINT #1, "320 PRINT CHR$(Z);: GOTO 280"
1010 PRINT #1, "RUN 90" : PAUSE = 200 : GOSUB 2040 : RETURN
1020 REM
1030 REM   GET A CHARATER STRING FROM THE VELMEX FROM INTERUPT CALL
1040 REM
1050 B$ = INPUT$(LOC(1),#1) : RETURN
1060 '--------------------------------------
1070 '   RE-ZERO STRAIN GAUGE
1080 '--------------------------------------
1090 MD = 15 : CH = 1 : ST = 0
1100 CALL IODR(MD,CH,DA,ST) : RETURN
1200 '--------------
1210 ' program zero
1220 '--------------
1230 GOSUB 2000: OFFSET=-(STRAIN-OFFSET): GOSUB 2000: RETURN
2000 '--------------------------------------
2005 ' GET STRAIN GUAGE READING INTO DA
2010 '--------------------------------------
2020 MD = 5 : CALL IODR(MD,CH,STRAIN,ST) : X = POS(0) : Y = CSRLIN
2025 STRAIN = STRAIN + OFFSET  'STRAIN=(STRAIN)/8
2030 LOCATE 2,70,1 : PRINT USING " ### "; STRAIN; : LOCATE Y,X,1 : RETURN
2040 FOR D = 1 TO PAUSE : NEXT D : GOSUB 2020 : RETURN
2050 '--------------------------------------
2060 ' List reed data
2070 '--------------------------------------
2080 FOR A = 1 TO MAXA: FOR B = 1 TO MAXB: PRINT USING "###"; ABS(ST(A,B));
2090 NEXT B: PRINT: NEXT A: PRINT
2100 IF MAXA>10 THEN INPUT "press Enter to continue ";X$
2110 FOR A = 1 TO MAXA: FOR B = 1 TO MAXB: PRINT USING "###"; SS(A,B);
2120 NEXT B: PRINT: NEXT A: PRINT: INPUT "Press ENTER"; X: RETURN
```

```
2130 '----------------------------------------
2140 '   EDIT THE REED DATA
2150 '----------------------------------------
2160 CLS : PRINT "Enter 0,0,0 to quit" : FOR A = 1 TO MAXA : FOR B = 1 TO MAXB
2170 PRINT USING "###"; ST(A,B); : NEXT B : PRINT : NEXT A : PRINT
2180 INPUT "Row, Col, Value: "; R,C,V : IF R = 0 OR C = 0 THEN RETURN
2190 ST(R,C) = V : GOTO 2160
2200 '----------------------------------------
2210 '   SAVE THE REED DATA
2220 '----------------------------------------
2230 PRINT : ON ERROR GOTO 2310 :   FILES "*.RED" : PRINT
2240 INPUT "Filename: ";Z$: IF Z$="" THEN RETURN
2250 OPEN Z$+".RED" FOR OUTPUT AS #2 : PRINT #2, -MAXA: PRINT #2, MAXB
2260 FOR A = 1 TO MAXA: FOR B = 1 TO MAXB
2270      PRINT #2, ST(A,B): NEXT: NEXT
2280 FOR A = 1 TO MAXA: FOR B = 1 TO MAXB
2290      PRINT #2, SS(A,B): NEXT: NEXT
2300 CLOSE #2: ON ERROR GOTO 0: RETURN
2310 IF ERL = 2230 THEN RESUME 2240 ELSE PRINT "Error in filename" : RESUME 2240
2320 '----------------------------------------
2330 '   Load the Reed data from diskette
2340 '----------------------------------------
2350 PRINT: ON ERROR GOTO 2450: FILES "*.RED": FILES "b:*.red": PRINT
2360 INPUT "Filename: "; Z$: IF Z$="" THEN RETURN
2364 Y$=Z$+".red"
2370 OPEN Y$ FOR INPUT AS #2: INPUT #2, MAXA: INPUT #2, MAXB
2380 FOR A = 1 TO ABS(MAXA): FOR B = 1 TO MAXB    'flex values
2384      IF EOF(2) THEN 2440    'no more stuff
2390      INPUT #2, ST(A,B): NEXT: NEXT
2400 ZZ=0: IF MAXA<0 THEN ZZ=1
2410 FOR A = 1 TO ABS(MAXA): FOR B = 1 TO MAXB    'load touch values
2414      IF EOF(2) THEN 2440    'no more stuff
2420      IF ZZ=1 THEN INPUT #2, SS(A,B) ELSE SS(A,B) = 0
2430      NEXT: NEXT
2440 CLOSE #2: ON ERROR GOTO 0: MAXA = ABS(MAXA): RETURN
2450 IF ERL = 2350 THEN RESUME 2360 ELSE PRINT "Error ";ERL;ERR: RESUME 2360
2460 '----------------------------------------
2470 '   print reed data
2480 '----------------------------------------
2490 FOR A = 1 TO MAXA: FOR B = 1 TO MAXB: LPRINT USING "#####"; ST(A,B);
2500 NEXT: LPRINT: LPRINT: NEXT: LPRINT: INPUT "print touch values ";X$
2510 IF X$<>"Y" AND X$<>"y" THEN RETURN
2520 FOR A = 1 TO MAXA: FOR B = 1 TO MAXB: LPRINT USING "####"; SS(A,B);
2530 NEXT: LPRINT: NEXT: LPRINT: RETURN
2540 '----------------------------------------
2550 '   SET SCAN SIZE
2560 '----------------------------------------
2570 PRINT "Current A: "; MAXA; "  Current B: "; MAXB
2580 INPUT "Enter A,B: "; MAXA,MAXB : RETURN
2590 '----------------------------------------
2600 '   COMMUNICATE WITH THE VELMEX
2610 '----------------------------------------
2620 PRINT "Press <Esc> to Quit.  Remember to type RUN 90 first." : PRINT
2630 PRINT #1, "0"; : ON COM(1) GOSUB 2660 :    COM(1) ON
2640 Z$ = INKEY$ : IF LEN(Z$) = 0 THEN 2640
2650 IF Z$ = CHR$(27) THEN ON COM(1) GOSUB 1050 :    COM(1) ON : RETURN ELSE PRINT #1, Z$; : GOTO 2640
2660 B$ = INPUT$(LOC(1),#1) : PRINT B$; : RETURN
2670 '----------------------------------------
3000 '   SCAN REED
3010 '----------------------------------------
3020 '
3030 '   CLEAR THE SCAN DATA ARRAY
3040 '
3050 FOR A = 1 TO MAXA : FOR B = 1 TO MAXB : ST(A,B) = 0 : NEXT B : NEXT A
3060 NOREADS= 1 : CMD$ = "7" : GOSUB 3450 : DIR = 1
3070 GOSUB 11080:GOSUB 11080:GOSUB 11080:GOSUB 11080
3080 '   SCAN THE LENGTH OF THE REED, FROM FRONT TO BACK (THICK TO THIN)
3090 FOR A = 1 TO MAXA : IF DIR = 0 THEN DIR = 1 ELSE DIR = 0
3100 '
3110 '   SCAN THE WIDTH OF THE REED, FROM LEFT TO RIGHT; GET STRAIN AT POINT
3120 '
3130 FOR B = 1 TO MAXB
3140 REM
3150 REM  CHECK FOR CANCEL KEY (ESCAPE) FROM USER
3160 REM
3170 Z$ = INKEY$ : IF Z$ <> CHR$(27) THEN 3230
3180 Z$ = INKEY$ : IF Z$ = "" THEN 3180 ELSE IF Z$ = CHR$(27) THEN RETURN
```

```
3190 IF Z$ <> "." THEN CMD$ = Z$ : GOSUB 3450 : GOTO 3180
3200 REM
3210 REM  SET UP ALL VARIABLES FOR SCAN - SET VERT. HOME
3220 REM
3230 DOWN = 0 : PAUSE = MAXP : STRAIN = 0 : THRSHSTR = 12
3240 CMD$ = "A" : GOSUB 3450 : CMD$ = "A" : GOSUB 3450
3250 '----------
3260 ' find flex
3270 '----------
3280 GOSUB 9000 'flex routine
3290 IF ZFLEX = 0 THEN GOSUB 3500 ELSE GOSUB 3570 ' move
3300 ST(A, ABS(B - (DIR * (MAXB + 1)))) = ZFLEX
3310 SS(A, ABS(B - (DIR * (MAXB + 1)))) = ZTOUCH
3320  PRINT USING "###"; ABS(ZFLEX);
3330 NEXT B
3340 CMD$ = "@" : GOSUB 3450
3350 CMD$ = "2" : GOSUB 3450 : PRINT
3360  CMD$ = "<" : GOSUB 3450
3370 NEXT A
3380 REM
3390 REM  HOME - DONE WITH SCAN - MAKE NOISE FOR OPERATOR TO WAKE UP
3400 REM
3410 CMD$ = "7" : GOSUB 3450 : SOUND 440,25 : SOUND 880,25 : SOUND 659,50 : CMD$
 = ">" : GOSUB 3450 : RETURN
3420 REM
3430 REM  SEND COMMAND TO THE VELMEX
3440 REM
3450 IF CMD$ <= " " THEN RETURN ELSE B$ = ""
3460 PRINT #1, CMD$; : WHILE B$ <> CMD$ : WEND : RETURN
3465 'FOR TIMER=1 TO,150:NEXT 'delay enough to keep velmax from lousing things u
p too badly.
3470 RETURN
3480 REM  MOVE LEFT OR RIGHT ONE - NO REED FOUND
3490 REM
3500 IF B = MAXB THEN RETURN
3510 CMD$ = "=" : GOSUB 3450
3520 IF DIR = 0 THEN CMD$ = "6" ELSE CMD$ = "4"
3530 GOSUB 3450
3540 RETURN
3550 REM  MOVE LEFT OR RIGHT ONE - REED FOUND
3560 REM
3570 IF B = MAXB THEN RETURN
3580 CMD$ = "@" : GOSUB 3450
3590 IF DIR = 0 THEN CMD$ = "6" ELSE CMD$ = "4"
3600  GOSUB 3450 : CMD$ = "B" : GOSUB 3450 : GOSUB 3450
3610 RETURN
6000 '-------------
6010 ' cut a box    v 1.1
6020 '-------------
6024     REDPOST = 0  'vertical pos.
6026     VOFFSET = 0  'offset from v. home
6030     WB# = 1.1#:    ' % ok to scan without repositioning bit
6032     WLIM = 1500        ' break for mid numbers
6034     WLIB = 2200        ' break for high numbers
6036     WMIN# = 1.12#      ' min. target percent for mid numbers
6038     WMIB# = 1.2#       ' min. target percent for high numbers
6040     WH# = 1.3#:    ' (%) too hard to cut
6044     WS# =  .7#     ' (%) too soft to cut
6050 '   WP#    - current % to cut
6060 '   WF#    - min % to cut
6070 '   WE#    - max difference, target/actual
6080     WP = 0 'break has not occured yet
6082 '   WC    0 = current WFLEX was taken with scan bit
6084 '              (valid only for ZCUT adjustment)
6090 '   WF    1 = first time through switching bits
6092     WQ = 0 ' first pass
6094 '        = 1    reed has been scanned, normal cutting
6096 '        = 3    last pass
6100 INPUT "new reed ";X$: IF X$="n" OR X$="N" THEN WQ=1
6104 IF X$="" THEN RETURN
6110 WR=1: INPUT "Repeat (y/n) ";X$: IF X$="N" OR X$="n" THEN WR=0
6114 IF X$="" THEN RETURN
6120 GOSUB 7080 'open files (record of cutting)
6130 INPUT "How close (% start) ";X: WP#=X/100#: WP# = WP#+1#
6140 IF WR=1 THEN INPUT "How close (% end) ";X: WF#=X/100#: WF#=WF#+1#
6142 INPUT "How close, mid rows (%) ";X#: WMIN#=(X#/100#)+1#
6144 INPUT "Break value, mid row ";X: IF X > 0 THEN WLIM=X
6146 INPUT "Max amount to cut, back rows (%) ";X#: WMIB#=1#-(X#/100#)
```

```
6148 INPUT "Break value, back row ";X: IF X > 0 THEN WLIB=X
6150 IF WF# > WE# AND WE# > 0 AND WQ = 1 THEN GOTO 7180  'close enough already
6160 IF WP# > WE# AND WE# > 0 AND WQ = 1 THEN WP# = WE#
6164 LPRINT: LPRINT: LPRINT "<< cutting ";DATE$;" ";TIME$;" >>": LPRINT
6170 '-------- move to front left corner of box -----------
6180 GOSUB 11070: ZP=1: WE#=1: IF WP# >= WB# THEN ZP=0    ' scan w/ cut bit
6190 WF=0: IF ZP = 1 AND WP =0 THEN WP=1: WP#=WP#+.05#: WF = 1
6194 CLS: IF WF = 1 THEN INPUT "ENTER to continue";X$
6196 IF WQ = 0 THEN PRINT "First pass"
6198 IF WQ = 3 THEN PRINT "Last pass"
6200 IF WQ <> 0 THEN PRINT "cutting at ";INT((WP#-1)*100+.5);" %":PRINT
6210 LPRINT "cutting at ";INT((WP#-1)*100+.5);" %"
6230 FOR WA=1 TO 4: GOSUB 11080: NEXT       ' go forward
6240 '----------- clear array - first & last pass ---------
6250 MAXA=ABS(MAXA): IF WQ = 1 THEN GOTO 6280
6255 IF WQ<>0 AND WQ<>3 THEN LPRINT "error in 6255 -";WQ: STOP 'out of bounds
6260 FOR X=1 TO MAXA: FOR Y=1 TO MAXB
6264     IF WQ = 0 THEN SS(X,Y)=0: ST(X,Y) = ABS(ST(X,Y)) 'first pass
6266     SQ(X,Y)=0: NEXT: NEXT
6270 '-------------- move to back right ------------------
6280 GOSUB 11130: GOSUB 11130: GOSUB 11130: GOSUB 11130: GOSUB 11130  ' up 250
6290 FOR WA=1 TO (MAXA-1): GOSUB 11020: NEXT   ' back
6300 IF MAXB = 25 THEN GOSUB 11160: GOSUB 11040 'right 25, left 1 (right 24)
6320 IF MAXB<> 25 THEN FOR WB = 1 TO (MAXB-1): GOSUB 11060: NEXT   ' right
6390 GOSUB 11120: GOSUB 11120: GOSUB 11120: GOSUB 11120        ' dn 200
6400 '------------------------------------------------------
6410 IF ZP<>0 OR WQ=0 THEN GOTO 6420
6414     GOSUB 11180 'switch to cutting bit (unless 1st pass)
6416     XX=-50-REDPOST: GOSUB 8600
6420 FOR WA = MAXA TO 1 STEP -1    'rows
6430     Y=0: FOR X = 1 TO MAXB   ' see if can skip row
6440         IF SQ(WA,X) <= (WP#*ST(WA,X)) THEN GOTO 6450
6444         IF SQ(WA,X) <= (WMIN#*ST(WA,X)) AND ST(WA,X) > WLIM THEN 6450
6446         IF SQ(WA,X) <= (WMIB#*SS(WA,X)) AND ST(WA,X) > WLIB THEN 6450
6448              Y = 1 ' don't skip row
6450         NEXT
6460     IF Y = 0 AND WQ = 1 THEN PRINT "skipping row";WA: GOTO 6930
6470     FOR WB = MAXB TO 1 STEP -1    'points
6474 A$=INKEY$: IF A$ <> "" THEN A$="": INPUT "ENTER"; XX 'user interrupt
6480         WC=0:WST = ST(WA,WB): WSS = SS(WA,WB) ' target reed, orig. cut reed
6484 '----------- evaluate point for possible scanning ------------
6490         IF WF = 1 THEN SQ(WA,WB) = INT (SQ(WA,WB) * 1.1 + .5)
6494         IF WQ <> 1 THEN GOTO 6510 ELSE Y = 0   ' check against old data
6500             IF SQ(WA,WB) <= (WP#*WST) THEN Y = 1
6502             IF SQ(WA,WB) <= (WMIN#*WST) AND WST > WLIM THEN Y = 1
6504             IF SQ(WA,WB) <= (WMIB#*WSS) AND WST > WLIB THEN Y = 1
6506             IF WST > WLIB AND WP# <= 1.2# THEN Y=1 'no backrow scan/cut
6508             IF Y = 1 THEN PRINT WA;",";WB: GOTO 6900 ' close enough
6510         IF WST = 0 THEN GOTO 6900    ' don't scan - target zero
6512 '----------------- touch -----------------
6514         IF WQ<>0 THEN XX=SN(WA,WB)-REDPOST: GOSUB 8600
6516             IF ABS(REDPOST-SN(WA,WB))>10 AND WQ<>0 THEN LPRINT "error in 65
16 - ";WA;WB;SN(WA,WB);REDPOST
6520 '---------- scan the point, print, set max error -------------
6530         ZCLOSE = WST * ((WP#-1#) / 3)
6540         GOSUB 9000: IF ZP=0 AND WQ<>0 THEN ZFLEX = INT(.95#*ZFLEX)
6550         WFLEX = ZFLEX: PRINT WA;",";WB,WFLEX;"/";WST;" ";
6552         PRINT INT(((WFLEX-WST)/WST)*1000)/10;" %"
6554             IF WST > WLIM AND ZFLEX <= (WMIN#*WST) THEN GOTO 6570 'point ok
6556             IF WST > WLIB AND ZFLEX <= (WMIB#*WSS) THEN GOTO 6570 'point ok
6560                 IF (ZFLEX*1#)/WST > WE# THEN WE#=(ZFLEX*1#)/WST
6570         SQ(WA,WB) = ZFLEX: IF WQ=3 THEN PRINT #3, ZFLEX
6571         IF ZFLEX=0 THEN SN(WA,WB)=0  'no offset, point slip
6572         IF WQ<>0 THEN GOSUB 11130: GOSUB 11130 'up 100 not 1st
6573 '-------------- first pass stuff --------------
6574         IF WQ=0 THEN SS(WA,WB)=ZFLEX: PRINT #2, ZFLEX
6580 '-------------- evaluate point for possible cutting ----------------
6590         IF ZFLEX = 0 THEN GOTO 6900 'don't cut - zero
6594         IF WQ > 0 THEN 6610   'first time through - just scan
6596             IF WB = 1 OR WB = MAXB OR WA = 1 THEN GOTO 6604 'edge
6600                 IF ZFLEX<(WST*WS#) THEN GOSUB 7040: IF X=0 THEN 7170 'soft
6604             IF ZFLEX>(WST*WH#) THEN GOSUB 7074: IF X=0 THEN 7170 ' too hard
6606             GOTO 6900
6610         IF ZFLEX <= (WP#*WST) THEN GOTO 6900 'close enough
6612         IF WST > WLIM AND ZFLEX <= (WMIN#*WST) THEN GOTO 6900 'close enough
6614         IF WST > WLIB AND ZFLEX <= (WMIB#*WSS) THEN GOTO 6900 'cut enough
6616 IF WST > WLIB THEN LPRINT WA; WB; ZFLEX; WSS; WST; WMIB#; WLIB; WQ; WP#
6660         IF WFLEX > (1.1 * WST) THEN ZCUT=3*WFLEX ELSE ZCUT=2.5*WFLEX
```

```
6670        IF ZCUT > (7 * WST) THEN ZCUT = 7*WST
6680        IF ZCUT > 6000 THEN ZCUT = 6000
6690        IF WFLEX < (1.05 * WST) THEN ZCUT =700
6700        '---------- set target for cut ------------
6710        WTARGET = WP# * WST
6720        IF WP# <= 1.08 THEN WTARGET = ((1 + WP#)/2) * WST
6722        IF WTARGET < (WMIN#*WST) AND WST > WLIM THEN WTARGET=WMIN#*WST
6724        IF WTARGET < (WMIB#*WSS) AND WST > WLIB THEN WTARGET=WMIB#*WSS
6726        PRINT "target = ";WTARGET
6730        '---------- cut the point -------------
6736 IF WC<>0 THEN LPRINT "error in 6736":STOP
6740        WHILE WFLEX > WTARGET
6750            IF ZP=1 THEN GOSUB 11180 ' switch to cutting bit
6760            GOSUB 12000
6770            IF ZP=1 THEN GOSUB 11190 ' switch to scan bit
6780            ZCLOSE = ST(WA,WB) * ((WP#-1#) / 3)
6790            GOSUB 9000: IF ZP=0 THEN ZFLEX = INT(.9#*ZFLEX)
6800            PRINT ,,ZFLEX,ST(WA,WB),ZCUT
6810            WCUTED = WFLEX - ZFLEX: WREMAIN = ZFLEX - WTARGET
6814            IF WCUTED > (.7*WREMAIN) THEN ZCUT=.6*ZCUT
6816            IF WC = 0 THEN WC =1: GOTO 6880  'don't adjust on first pass
6820            IF WCUTED < (.25*WREMAIN) THEN ZCUT=1.1*ZCUT  'adj. zcut
6830            IF WCUTED <-(.5*WREMAIN) THEN ZCUT=1.1*ZCUT
6844            IF WCUTED < 0 THEN ZCUT=2*ZCUT
6850            IF ZCUT > (7*WTARGET) THEN ZCUT=7*WTARGET  'limit zcut
6860        IF WTARGET < 1000 AND ZCUT > (5.3*TARGET) THEN ZCUT=5.3*WTARGET
6870            IF ZCUT > 6000 THEN ZCUT = 6000
6880            WFLEX=ZFLEX: WEND
6890        XX=SN(WA,WB)-REDPOST: GOSUB 8600  'touch
6894        GOSUB 11130: GOSUB 11130 'up 100
6900        IF WQ=0 AND ZFLEX<200 THEN XX=-50-REDPOST: GOSUB 8600
6902        IF WQ>0 THEN XX=SN(WA,WB)-REDPOST-30:IF ABS(XX)>20 THEN GOSUB 8600
6904        GOSUB 11040: NEXT 'next point
6908    IF WA = 1 THEN 6930  'skip setup for last row
6910        GOSUB 11130: GOSUB 11130: GOSUB 11130: GOSUB 11130 'up 200
6912        IF MAXB = 25 THEN GOSUB 11160 'over 25
6914        IF MAXB <> 25 THEN FOR WX = 1 TO MAXB: GOSUB 11060: NEXT 'over
6920        GOSUB 11120: GOSUB 11120: GOSUB 11120 'down 150, not 1st row
6924        IF WQ = 0 THEN ATRAK=6920: GOSUB 8500 'touch if first pass
6930    GOSUB 11080: NEXT 'next row
6940 IF ZP=0 AND WQ<>0 THEN GOSUB 11190  'switch to scan bit (unless first pass)
6950 GOSUB 11130: GOSUB 11130: GOSUB 11130: GOSUB 11130: GOSUB 11130: GOSUB 1113
0: GOSUB 11070 'up200,home
6960 WP#=((WP#-1)*.75#+1#): IF WP# > (WE#+.005) THEN GOTO 6960
6970 IF WP# < WF# THEN WP# = WF#  'min % to cut
6972 IF WQ = 3 THEN PRINT "LAST PASS ERROR"; INT (WE#*100+.5): GOTO 7170
6975 IF WQ=0 THEN FOR X=1 TO MAXA:FOR XX=1 TO MAXB:LPRINT SN(X,XX);:NEXT:LPRINT:
NEXT
6980 IF WE# > WF# THEN WQ=1: GOTO 6180  'not low enough yet, try again
6990 IF WQ=1 THEN WQ=3: SOUND 400,10: GOTO 6180
7000 GOTO 7170 'end
7040 '---------------
7050 ' target error
7060 '---------------
7070 PRINT "ERROR - target is to soft ";X: SOUND 329.63,1:SOUND 294,1: SOUND 262
,1: SOUND 247,1: SOUND 220,2: RETURN
7074 PRINT "ERROR - target is to hard ";X: SOUND 196,1: SOUND 220,1: SOUND 247,1
: SOUND 262,1: SOUND  294,1 : SOUND 329.63,1: SOUND 349,1: SOUND 392,1: SOUND 44
0,4: RETURN
7080 '---------------
7090 ' open files for saving data
7100 '---------------
7110 PRINT: ON ERROR GOTO 7160: FILES "b:*.red":PRINT
7120 INPUT "filename: ";WF$: IF WF$="" THEN 7120
7130 OPEN "b:"+WF$+"a.red" FOR OUTPUT AS #2: PRINT #2,MAXA:PRINT #2,MAXB
7140 OPEN "b:"+WF$+"b.red" FOR OUTPUT AS #3: PRINT #3,MAXA: PRINT #3,MAXB
7150 ON ERROR GOTO 0: RETURN
7160 IF ERL = 7110 THEN RESUME 7120 ELSE PRINT "Error in filename": RESUME 7120
7170 '--------
7180 ' end
7190 '--------
7200 PRINT: GOSUB 11070: CLOSE #2: CLOSE #3: GOTO 16000
7210 LPRINT "subroutine reference error at 7210" 'should be to 9000
7220 GOTO 9000
8000 '-----------------------------------------
8010 ' sub. to reduce force on reed
8020 '-----------------------------------------
8030 XCOUNT=0: GOSUB 2040 'initial strain
```

```
8040        WHILE STRAIN > 30 AND XCOUNT < 20
8050            GOSUB 11110: XCOUNT=XCOUNT+1   'up 10
8060            GOSUB 2040: WEND
8065 PRINT "done up, x = ";XCOUNT;" strain = ";STRAIN
8070    IF STRAIN <= 30 THEN RETURN   'normal exit
8080 SOLD=STRAIN: GOSUB 11110: GOSUB 2040  'go up 10 more
8090 IF (STRAIN+10) < SOLD THEN GOTO 8000  'still on read, repeat
8094 LPRINT "0 RESET 8094"
8100 GOSUB 1200: RETURN  'reset zero, above reed
8110 '------------------------------------------
8500 '------------------------------------------
8510 ' sub. to touch reed
8520 '------------------------------------------
8530 XCOUNT=0: GOSUB 2040  'initial strain
8540    WHILE STRAIN < 20 AND XCOUNT < 35
8550        GOSUB 11100: XCOUNT=XCOUNT+1  'down 10
8560        GOSUB 2040: WEND
8570    IF STRAIN >= 20 THEN ATRAK=0: RETURN   'normal exit
8574 LPRINT "touch lost 8574 - ";ATRAK;WA;WB;WQ: ATRACK=0
8580 GOSUB 11130: GOSUB 11130: GOSUB 11130  'up 150
8590 GOSUB 11130: GOSUB 11130: GOSUB 11130  'up 150
8595 RETURN
8600 '-------- move xx from current pos. ---------
8620 FOR X = 1 TO ABS(XX\50)
8630    IF XX>0 THEN GOSUB 11120 ELSE GOSUB 11130  'down 50 else up 50
8640    NEXT
8650 FOR X = 1 TO ABS((XX MOD 50)\10)
8660    IF XX>0 THEN GOSUB 11100 ELSE GOSUB 11110  'down 10 else up 10
8670    NEXT
8680 RETURN
9000 '------------------------------------------
9004 '   FIND FLEX. AT CURRENT POINT    v 1.1
9010 '          returns ZFLEX - flexibility
9020 '          uses Z... var. names,
9030 '          2210-2230 - SEND COMMANDS TO VELMAX
9040 '          1010 - get strain reading, update display, pause
9050 ZTOUCH = 5      ' coarse touch
9060 ZTOUCH2 = 10    ' fine touch
9070 ZREPS = 5       ' number of cycles in test
9080 ZTRIES = 5      ' number of tests before giving up
9090 ZJOGS = 25      ' number of down movements to find reed
9100 ZFUDGE# = 2.48# ' fudge factor for 30/10/20 flex readings
9110 ZBREAK = 800    ' when to start using 30/10/20
9120 GOSUB 2040: ZFLEX = 0: ZZ = 0
9130 IF ZCLOSE = 0 THEN ZCLOSE = 4
9134 IF WQ = 0 THEN SN(WA,WB)=-250
9140 WHILE STRAIN < 20 AND ZZ < ZJOGS    'find reed
9150     GOSUB 11100: ZZ = ZZ + 1
9160     GOSUB 2040: WEND
9164 IF STRAIN<20 AND WA>0 THEN LPRINT "no reed found 9164 - ";WA;WB;REDPOST;SN(WA,WB);WQ
9170 IF STRAIN<20 THEN FOR Z=1 TO 4: GOSUB 11130: NEXT: GOTO 9450    'no good; up
9180 IF STRAIN > ZTOUCH THEN GOSUB 11110: GOSUB 2040: GOTO 9180   'up
9190 IF STRAIN=ZTOUCH THEN GOSUB 11090:GOSUB 2040: GOTO 9190  'up slower
9200 Z = 0: WHILE STRAIN < ZTOUCH AND Z < ZJOGS  'down
9210     GOSUB 11170: GOSUB 2040
9220     Z = Z + 1: WEND
9230 IF STRAIN<ZTOUCH THEN FOR Z=1 TO ZZ+4: GOSUB 11110: NEXT: GOTO 9450
9240 Z = 0: WHILE STRAIN < ZTOUCH2 AND Z < ZJOGS 'fine down
9250     GOSUB 11030: GOSUB 2040: GOSUB 2040: GOSUB 2040
9260     Z = Z + 1: WEND
9270 ZTOUCH=STRAIN: ZX=0: ZW=0: IF WQ=0 THEN SN(WA,WB)=REDPOST
9272 '----------------- if +first pass adjust v. home -----------------
9274 IF WQ>0 THEN X=SN(WA,WB)-REDPOST: REDPOST=REDPOST+X: VOFFSET=VOFFSET+X
9280     GOSUB 11140:    'down 30 <<start flex test>>
9290     IF ZX > 0 THEN GOTO 9310
9300         IF (STRAIN-ZTOUCH)>ZBREAK THEN ZW=1   ' small flex
9310     IF ZW = 0 THEN GOSUB 11140                'down 30 more
9320     GOSUB 11110: GOSUB 2040 : GOSUB 2040  'up 10
9330     ZZ=STRAIN
9340     IF ZW = 1 THEN GOSUB 11150 ELSE GOSUB 11130  'up 20/50
9350     GOSUB 2040: GOSUB 2040: GOSUB 2040: GOSUB 2040
9360     ZZ=ZZ-STRAIN: IF STRAIN>0 THEN GOTO 9400 ELSE ZFLEX=0
9370         IF ZZ < 40 THEN ZX=ZX+1: LPRINT "slip durring flex": GOTO 9450
9380         IF ZTRIES > 0 THEN ZTRIES=ZTRIES-1: LPRINT "slip/repeat": GOTO 9120
9390         LPRINT "multiple slip error": GOTO 9450
9400     IF ABS(ZFLEX - ZZ) < ZCLOSE THEN ZX=2: ZFLEX = (ZFLEX+ZZ)/2: GOTO 9430
9410     IF ZX > 0 THEN ZFLEX = ZFLEX + ZZ
9420     ZX = ZX+1: IF ZX < ZREPS THEN GOTO 9280
```

```
9430      ZFLEX=ZFLEX/(ZX-1): IF ZW=1 THEN ZFLEX = INT(ZFLEX*ZFUDGE# + .5)
9440  GOSUB 11090: GOSUB 2040: IF ZW=1 THEN PRINT "*";
9450  ZCLOSE=0
9455  GOSUB 2040: IF STRAIN > 100 THEN GOSUB 11110: GOSUB 2040: GOTO 9455
9460  RETURN
9470  GOSUB 7210:PRINT "flex = ";ZFLEX   '----------
9480  PRINT "touch = ";ZTOUCH
9490  PRINT "reps = ";ZX
10030 INPUT "Press ENTER to continue";X:RETURN
11000 '------------------------------------------
11010 'movement commands to velmx
11020 CMD$="2":GOSUB 3450:RETURN
11030 CMD$="3":GOSUB 3450:REDPOST=REDPOST+1:RETURN  'dn 1
11040 CMD$="4":GOSUB 3450:RETURN
11050 CMD$="5":GOSUB 3450:RETURN
11060 CMD$="6":GOSUB 3450:RETURN
11070 XX=-REDPOST:GOSUB 8600:CMD$="=":GOSUB 3450   'go to redpost, set v. home
11074 CMD$="7":GOSUB 3450:RETURN   'go home
11080 CMD$="8":GOSUB 3450:RETURN
11090 CMD$="9":GOSUB 3450:REDPOST=REDPOST-1:RETURN  'up 1
11100 CMD$="<":GOSUB 3450:REDPOST=REDPOST+10:RETURN 'dn 10
11110 CMD$=">":GOSUB 3450:REDPOST=REDPOST-10:RETURN 'up 10
11120 CMD$="?":GOSUB 3450:REDPOST=REDPOST+50:RETURN 'dn 50
11130 CMD$="@":GOSUB 3450:REDPOST=REDPOST-50:RETURN 'up 50
11140 CMD$="C":GOSUB 3450:REDPOST=REDPOST+30:RETURN 'dn 30
11150 CMD$="D":GOSUB 3450:REDPOST=REDPOST-20:RETURN 'up 20
11160 CMD$="E":GOSUB 3450:RETURN  'over 25 rows
11170 CMD$="F":GOSUB 3450:REDPOST=REDPOST+3:RETURN  'down 3
11180 GOSUB 11130: GOSUB 11130: GOSUB 11130: GOSUB 11120: GOSUB 8000: RETURN
11185 GOSUB 3450: GOSUB 11120: GOSUB 11120: GOSUB 11120: CMD$="G"  'cut bit
11190 GOSUB 11130: GOSUB 11130: GOSUB 11130: GOSUB 11130: CMD$="H"  'scan bit
11200 GOSUB 3450: GOSUB 11120: GOSUB 11120: GOSUB 11120: GOSUB 8000: RETURN
12000 '----------
12010 ' cut a point
12020 '----------
12050 Z=0: GOSUB 2040
12060 WHILE STRAIN < ZCUT AND Z < 30
12070     GOSUB 11100: GOSUB 2040: GOSUB 2040: Z=Z+1: WEND
12072 IF STRAIN < ZCUT THEN FOR X=1 TO 6: GOSUB 11130: NEXT: RETURN
12075 CMD$=":": GOSUB 3450
12076 IF ZCUT < 6000 OR WB = BMAX THEN GOTO 12080
12078       CMD$=":": GOSUB 3450: GOSUB 3450  'cut 2 more times
12080 FOR ZZ=1 TO INT(Z/5+.5): GOSUB 11130: NEXT
12090 FOR ZZ = 1 TO (Z MOD 5): GOSUB 11110: NEXT
12100 RETURN
14000 ' file compare routine ---------------------------
14010 PRINT: ON ERROR GOTO 14440:  FILES "*.RED": FILES "b:*.red": PRINT
14020 INPUT "filename 1 ";X$: IF X$="" THEN RETURN
14030 INPUT "filename 2 ";Y$: IF Y$="" THEN RETURN
14040 OPEN X$+".RED" FOR INPUT AS #2
14050 OPEN Y$+".RED" FOR INPUT AS #3
14060 INPUT #2,MAXA: MAXA=ABS(MAXA): INPUT #3,X: X=ABS(X)
14070 IF X < MAXA THEN MAXA=X   'set v. size to smallest
14080 INPUT #2,MAXB: INPUT #3,X
14090 IF MAXB<>X THEN PRINT "files are of different width":GOTO 14460
14100 LPRINT X$;" > ";Y$
14110 FOR A = 1 TO MAXA: FOR B = 1 TO MAXB
14120 INPUT #2,ZA: INPUT #3,ZB
14130 IF ZA <> 0 AND ZB <> 0 THEN GOTO 14180
14140     IF ABS(ZA)>0 THEN ST(A,B)=-9999: SQ(A,B)=-9999: GOTO 14170
14150     IF ABS(ZB)>0 THEN ST(A,B)=9999: SQ(A,B)=9999: GOTO 14170
14160     ST(A,B)=8888: SQ(A,B)=8888
14170     GOTO 14200
14180 ST(A,B)=INT(((ABS(ZB)-ABS(ZA))*1000#/ABS(ZA))+.5)
14190 SQ(A,B)=ABS(ZB)-ABS(ZA)
14200 IF ZA>=0 AND ZB>=0 THEN SS(A,B)=0
14210 IF ZA<0 AND ZB<0 THEN SS(A,B)=1
14220 IF ZA<0 AND ZB>=0 THEN SS(A,B)=2
14230 IF ZA>=0 AND ZB<0 THEN SS(A,B)=3
14240 NEXT: NEXT
14250 'print out
14260 FOR A=1 TO MAXA: FOR B=1 TO MAXB
14270     IF ST(A,B)=8888 THEN LPRINT " zero";: GOTO 14310
14280     IF ABS(ST(A,B))=9999 THEN LPRINT "error";: GOTO 14310
14290     IF ST(A,B)<>0 THEN LPRINT USING "###.#";ST(A,B)/10#;: GOTO 14310
14300     LPRINT "   . ";
14310     NEXT: LPRINT: NEXT: LPRINT
14320 FOR A=1 TO MAXA: FOR B=1 TO MAXB
```

```
14330      IF SQ(A,B)<>0 THEN LPRINT USING "#####";SQ(A,B);: GOTO 14350
14340      LPRINT "    .";
14350      NEXT: LPRINT: NEXT: LPRINT
14420 CLOSE #2: CLOSE #3: ON ERROR GOTO 0: RETURN
14430 STOP
14440 IF ERL=14010 THEN RESUME 14020
14450      PRINT "error in filename": RESUME 14020
14460 INPUT "press ENTER ";X$:GOTO 14420
15000 ' file averaging routine -------------------
15010 PRINT: ON ERROR GOTO 15480:  FILES "*.RED": PRINT
15020 INPUT "filename 1 ";S$(1): IF S$(1)="" THEN RETURN
15030 X=2: WHILE X<6 AND S$(X-1)<>""       'get filenames
15040      PRINT "filename";X;: INPUT S$(X)
15050      X=X+1: WEND: N=X-2
15060 FOR X = 2 TO N+1: OPEN S$(X-1)+".RED" FOR INPUT AS #X: NEXT
15070 INPUT #2,MAXA: MAXA=ABS(MAXA)    'get min(maxa)
15080 FOR X = 2 TO N: INPUT #X+1,Y: Y = ABS(Y)
15090      IF Y < MAXA THEN MAXA=Y
15100      NEXT
15110 INPUT #2,MAXB: FOR X = 2 TO N: INPUT #X+1,Y
15120      IF Y <> MAXB THEN GOTO 15500
15130      NEXT
15140 FOR X = 1 TO N: FOR Y = 1 TO N: SX#(X,Y)=0: SS(X,Y)=0     'clear arrays
15150      NEXT:NEXT
15160 CLS: PRINT "row ",
15170 FOR A=1 TO MAXA: PRINT A,: FOR B=1 TO MAXB   ' calc. diffs.
15180      FOR X = 1 TO N: INPUT #X+1, ST(1,X): NEXT
15190      FOR X = 1 TO N-1: FOR Y = X+1 TO N
15200      IF ST(1,X) = 0 OR ST(1,Y) = 0 THEN GOTO 15240
15210         Z = ( ABS( ST(1,X) ) + ABS( ST(1,Y) ) )/2
15220         XX# = ABS( ( ABS(ST(1,X))-ABS(ST(1,Y)) ) *100#/Z )
15230         SX#(X,Y) = SX#(X,Y) + XX#: SS(X,Y)=SS(X,Y)+1
15240      NEXT: NEXT
15250      NEXT: NEXT: CLS: GOSUB 15530
15260 FOR X = 1 TO N-1: FOR Y = X+1 TO N     'print results
15270      PRINT S$(X);" <> ";S$(Y),
15280      PRINT USING "###.## %";(SX#(X,Y)/(SS(X,Y)*1#))
15290      NEXT: NEXT: PRINT: PRINT
15300 PRINT "Enter weighting value for:";
15310 FOR X = 1 TO N                         weighting values
15320      PRINT TAB(22);S$(X);" (0-10) ";
15330      INPUT SQ(1,X): NEXT
15340 FOR X = 1 TO N: OPEN S$(X)+".RED" FOR INPUT AS #(X+1): NEXT
15350 FOR X = 1 TO N: INPUT #X+1,Y: INPUT #X+1,Y: NEXT
15360 PRINT "averaging.....";
15370 FOR A = 1 TO MAXA: PRINT "..";: FOR B = 1 TO MAXB  'calc average
15380      ST(A,B)=0: SS(A,B)=0: XX=0: Z=0
15390      FOR X = 1 TO N: INPUT #X+1,Y: Y=ABS(SQ(1,X)*Y)
15400         IF Y>0 THEN ST(A,B)=ST(A,B)+Y: XX=XX+SQ(1,X): Z=Z+1
15410         NEXT
15420      IF XX>0 THEN ST(A,B)=ST(A,B)/XX: SS(A,B)=Z
15430      NEXT: NEXT: PRINT: GOSUB 15530
15440 RETURN
15450 '-----------------------------------------------
15480      PRINT "error in filename": RESUME 15020
15490 '-----------------------------------------------
15500 PRINT "files are of different width"
15510 GOSUB 15540: GOSUB 16000: RETURN
15520 '-----------------------------------------------
15530 '-----------------------------------------------
15540 FOR X=2 TO 6: CLOSE #X: NEXT: RETURN
15550 '-----------------------------------------------
15560 STOP: GOSUB 15460: GOSUB 15490 ' 14990:   14600, 14700
16000 PRINT: INPUT "press ENTER to continue";X$: RETURN
19000 '----------------------------program stops here------------<19k>
19010 GOSUB 200: GOSUB 2040: GOSUB 3000 '200,main; 1010,strain; 1500,scan
19020 GOSUB 3420: GOSUB 4000 ' 2200,save; 2380,
19030 GOSUB 5000: GOSUB 6000: GOSUB 7210 ' find, cut, 9k-flex
19040 GOSUB 9470: GOSUB 11000: GOSUB 12000 ' 10k, 11k-move, 12k
19050 GOSUB 13000: GOSUB 14000: GOSUB 15000 ' 13k, 14k, 15k
19060 GOSUB 16000 ' 16k
20000 TEST
```

What I claim is:

1. An apparatus for producing a tonal duplicate of a master musical reed, comprising
    a fixture for holding the reed at one end, while permitting flexure of the other end,
    a force sensor supporting the fixture, for sensing forces applied to the surface of the reed,
    a tool for contacting the surface of the reed,
    means for moving the tool laterally in two dimensions across the surface of the reed,
    means for moving the tool predetermined distances toward and away from the surface of the reed,
    means for sensing contact between the tool and the reed surface,
    means for measuring the reaction force between the tool and the reed, and different points over the surface of the reed,
    whereby a flexural resistance map of the master reed can be made, and then a new reed can be installed in the fixture, measured, and modified to provide a tonal duplicate of the master.

2. The apparatus of claim 1, wherein the tool is a drill bit, and further comprising a motor for rotating the bit, and means for controlling the motor so that the bit can be held stationary, for producing flexural measurements, or rotated for modifying the reed.

3. A method of producing a tonal duplicate of a master musical reed, comprising steps of
    securing one end of the master reed on a fixture permitting only flexure of the reed tip,
    contacting a point on the surface of the reed with tool and sensing the tool position as contact occurs,
    moving the tool, normal to the surface of the reed, a predetermined distance toward the reed past the point of contact,
    measuring the resulting reaction force between the tool and the reed,
    storing the force measurement,
    repeating the contacting, moving, measuring and storing steps for a predetermined number of points in a two-dimensional array over substantially the entire surface of the reed, thereby generating a flexural resistance map of the reed, and then
    replacing the master reed with a new reed at least as stiff as the master, repeating the above steps with the new reed, and
    machining the surface of the new reed to produce a reed having a substantially identical flexural resistance map.

4. The method of claim 3, wherein the machining and contacting steps are done with the same tool.

5. The method of claim 4, wherein the tool is a drill bit held stationary during the contacting step, and rotated during the machining step.

6. The method of claim 5, wherein the machining step is performed at a given point on the new reed immediately after the contacting and measuring steps are performed at that point, without first laterally moving the tool.

* * * * *